(12) United States Patent
Mather et al.

(10) Patent No.: US 8,485,583 B2
(45) Date of Patent: Jul. 16, 2013

(54) STOWABLE SEAT ARRANGEMENT FOR A VEHICLE

(75) Inventors: Carl Mather, Lake Orion, MI (US); Todd R. Teasdale, Canton, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/325,822

(22) Filed: Dec. 14, 2011

(65) Prior Publication Data

US 2013/0154299 A1     Jun. 20, 2013

(51) Int. Cl.
*B60N 2/02*     (2006.01)

(52) U.S. Cl.
USPC .... 296/65.09; 296/66; 296/37.15; 296/37.14; 297/15

(58) Field of Classification Search
USPC ............... 296/65.09, 65.16, 66, 67, 69, 37.5, 296/68.1, 37.14, 37.15, 37.16, 64, 65.01, 296/65.03, 65.05, 65.11, 65.13; 297/15, 331, 297/14, 335, 378.12, 378.1, 334, 341, 378.14, 297/336
See application file for complete search history.

(56) References Cited

U.S. PATENT DOCUMENTS

| | | | | |
|---|---|---|---|---|
| 841,135 A * | 1/1907 | Finch | ............................... | 297/15 |
| 1,947,980 A * | 2/1934 | Feyrer | .............................. | 296/66 |
| 5,195,795 A * | 3/1993 | Cannera et al. | ............ | 296/65.09 |
| 6,279,982 B1 * | 8/2001 | Nishimura et al. | ........ | 296/65.09 |
| 6,869,138 B2 | 3/2005 | Rhodes et al. | | |
| 6,955,386 B2 | 10/2005 | Rhodes et al. | | |
| 6,962,384 B2 | 11/2005 | Rhodes et al. | | |
| 7,014,260 B2 * | 3/2006 | Moriyama et al. | .............. | 297/15 |
| 7,066,519 B2 | 6/2006 | Rhodes et al. | | |
| 7,066,539 B2 * | 6/2006 | Hatta et al. | ............... | 297/344.14 |
| 7,077,451 B2 | 7/2006 | Rhodes et al. | | |
| 7,377,571 B2 | 5/2008 | Ewers et al. | | |
| 2007/0210601 A1 * | 9/2007 | Phillips et al. | ............. | 296/37.14 |
| 2008/0224524 A1 | 9/2008 | Mather et al. | | |

* cited by examiner

*Primary Examiner* — Jason S. Morrow
*Assistant Examiner* — E Turner Hicks
(74) *Attorney, Agent, or Firm* — Frederick A. Krieger

(57) ABSTRACT

A stowable seat arrangement can include a seat having a seat back coupled to a seat bottom. A pair of front and rear legs can be pivotably coupled to the seat bottom. A floor panel can be fixed to the seat back. A stowage recess cover can be pivotably coupled to the vehicle and the front legs. The seat can be configured to selectively articulate from a deployed position to a stowed position where the seat can be received in a vehicle stowage recess. Pivotably raising the cover can automatically begin articulation of the seat from the deployed position to the stowed position. The floor panel can be in spaced relation to the floor when the seat is in the deployed position and can automatically move to a position in engagement with the floor to provide a flat load floor configuration when the seat is in the stowed position.

18 Claims, 11 Drawing Sheets

STOWABLE SEAT ARRANGEMENT FOR A VEHICLE

FIELD

The present disclosure relates generally to seating arrangements for a vehicle and, more particularly, to a stowable seating arrangement for a vehicle.

BACKGROUND

In motor vehicles such as vans, mini-vans and sport utility vehicles, it is desirable that passenger seating arrangements be optionally stowable on-board the vehicle when not in use to provide additional or improved storage capacity for carrying cargo. One potential solution to this desire for additional storage capacity is a seat assembly that is capable of being stowed to provide a flat load floor. One potential drawback of the current stowable seat assemblies is the complexity of the arrangements utilized to facilitate stowage of the seats. Another potential drawback of the current stowable seat assemblies is a need for the seats to be turned or flipped upside down such that a seating side of the seat bottom is facing a floor of a stowage tub in order to stow the seat assembly. To deploy the stowed seat, a user will then typically need to rotate the seat in an opposite manner from the stowed position in the stowage tub.

Thus, while stowable seat assemblies have generally worked for their intended purpose, there remains a need for continuous improvement in the relevant art.

SUMMARY

In one form, a stowable seat arrangement for a vehicle having a floor is provided in accordance with the present teachings. The stowable seat arrangement can include a seat, a pair of front legs, a pair of rear legs, a floor panel, and a stowage recess cover assembly. The seat can have a seat back pivotably coupled to a seat bottom. The pair of front and rear legs can each be pivotably coupled at a first end to the seat bottom. The floor panel can be fixed to the seat back. The stowage recess cover assembly can be pivotably coupled at a forward end to the vehicle and can be pivotably coupled to a second opposite end of the pair of front legs. The seat can be configured to selectively articulate from a deployed position to a stowed position where the seat is adapted to be received in a stowage recess of the vehicle. Pivotably raising the cover assembly about the forward end can be configured to automatically begin articulation of the seat from the deployed position to the stowed position. The floor panel can be positioned in spaced relation to the vehicle floor when the seat is in the deployed position and can be configured to automatically move with the seat to a position in engagement with the vehicle floor to provide a flat vehicle load floor configuration when the seat is in the stowed position.

In another form, a stowable seat arrangement for a vehicle having a floor is provided in accordance with the present teachings. The stowable seat arrangement can include a seat, a pair of frame members, a pair of front and rear legs, a floor panel and a stowage recess cover assembly. The seat can have a seat back pivotably coupled to a seat bottom. The pair of frame members can be coupled to the seat bottom. The pair of front legs can each have first and second members formed in an L-shaped configuration, where the first members can be coupled at a first end of the front legs to a forward end of the pair of frame members. The pair of rear legs can each be pivotably coupled at a first end to an opposite rearward end of the frame members. The floor panel can be fixed to the seat back. The stowage recess cover assembly can have first and second panel assemblies pivotably coupled to each other by a pair of linking members. The first panel assembly can be pivotably coupled at a forward end to the vehicle, and the second panel assembly can be pivotably coupled to the second members at a second opposite end of the pair of front legs. The second panel assembly can form part of the vehicle floor and can cover a portion of a stowage recess in a first position when the seat is in a deployed position. The seat can be configured to selectively articulate from the deployed position to a stowed position where the seat is configured to be received in the stowage recess of the vehicle. Pivotably raising the first panel assembly about the forward end can be configured to automatically begin articulation of the seat from the deployed position to the stowed position. The second panel assembly can be configured to automatically move from the first position to a second position in front of the seat when the seat is in the stowed position. The floor panel can be positioned in spaced relation to the vehicle floor when the seat is in the deployed position and configured to automatically move with the seat to a substantially horizontal position relative to and in engagement with the vehicle floor to form the part of the vehicle floor formed by the second panel assembly in the first position and provide a flat vehicle load floor configuration when the seat is in the stowed position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
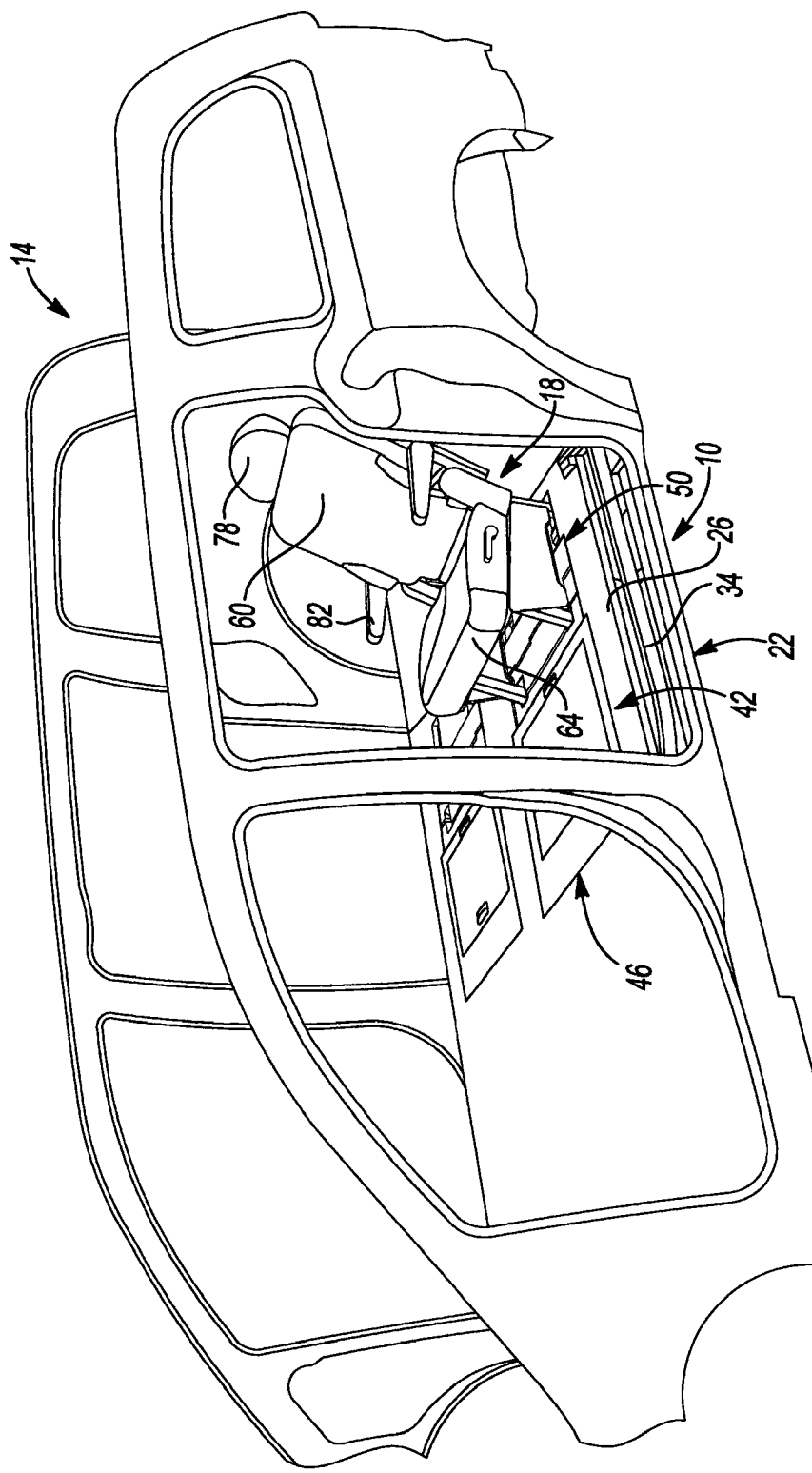
FIG. 1 is a perspective view of a partial exemplary vehicle structure showing an exemplary second row stowable seating arrangement with one stowable seat assembly in a deployed position along with a stowage recess and cover assembly according to the principles of the present disclosure.

With initial reference to FIGS. 1-5, a stowable seating arrangement 10 is provided for a motor vehicle 14 in accordance with the present teachings and can include a pair of outboard seat assemblies 18. As shown, the seating arrangement 10 may be for a second row of seating 22 for the vehicle 14 and can include outboard seat assemblies 18 in a spaced apart side-by-side configuration, noting that the figures illustrate the passenger side seat assembly in the stowed position or configuration. Vehicle 14 can generally include a floor 26, a first row of seating 30 and a stowage recess 34 configured to receive the stowable seating assembly 18 and an optional third row of seating. A stowage recess cover assembly 42 can include a first panel assembly 46 and a second panel assembly 50 selectively movably positioned over an opening of stowage recess 34, as will be discussed in greater detail below. It should be appreciated that while the following discussion will continue with reference to one of the outboard seat assemblies 18 (i.e., the driver side seat assembly 18), the discussion is applicable to both the passenger and driver side outboard seat assemblies 18, as well as for a center seat assembly (not shown) optionally positioned between the outboard assemblies and/or third row seating arrangements.

Figure 3:
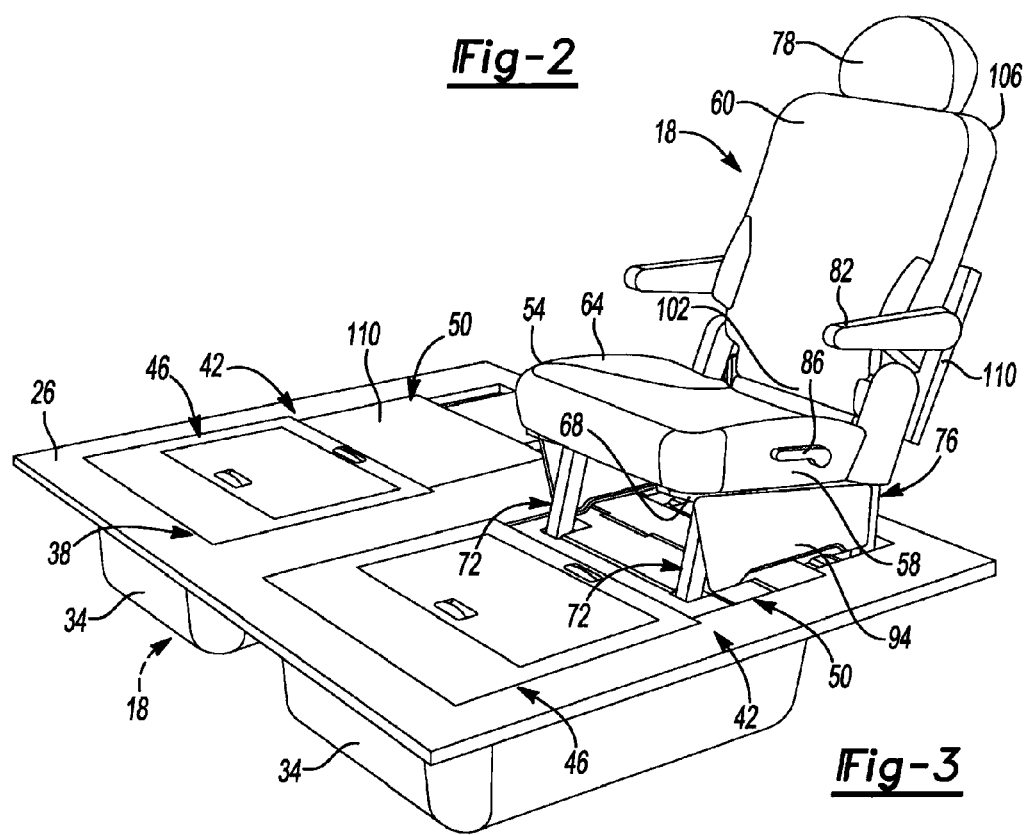
FIG. 3 is a perspective view of the stowable seating arrangement of FIG. 2 according to the principles of the present disclosure.
Figure 12A:
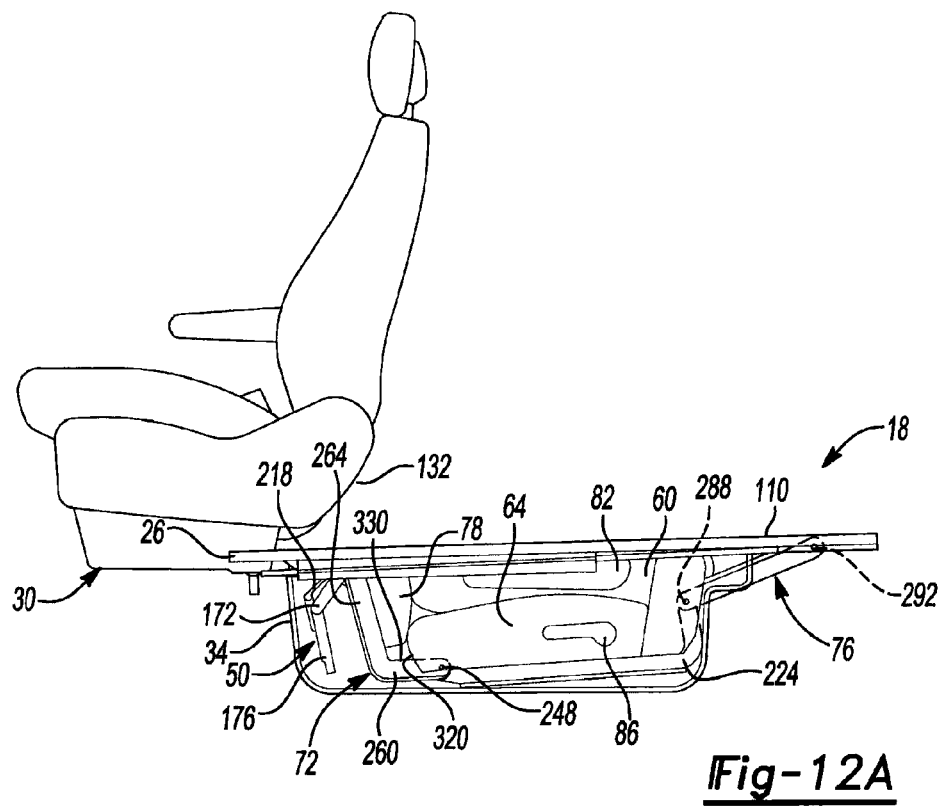
FIGS. 12A-12C are views depicting the stowable seat assembly in a stowed position according to the principles of the present disclosure.
Figure 12B:
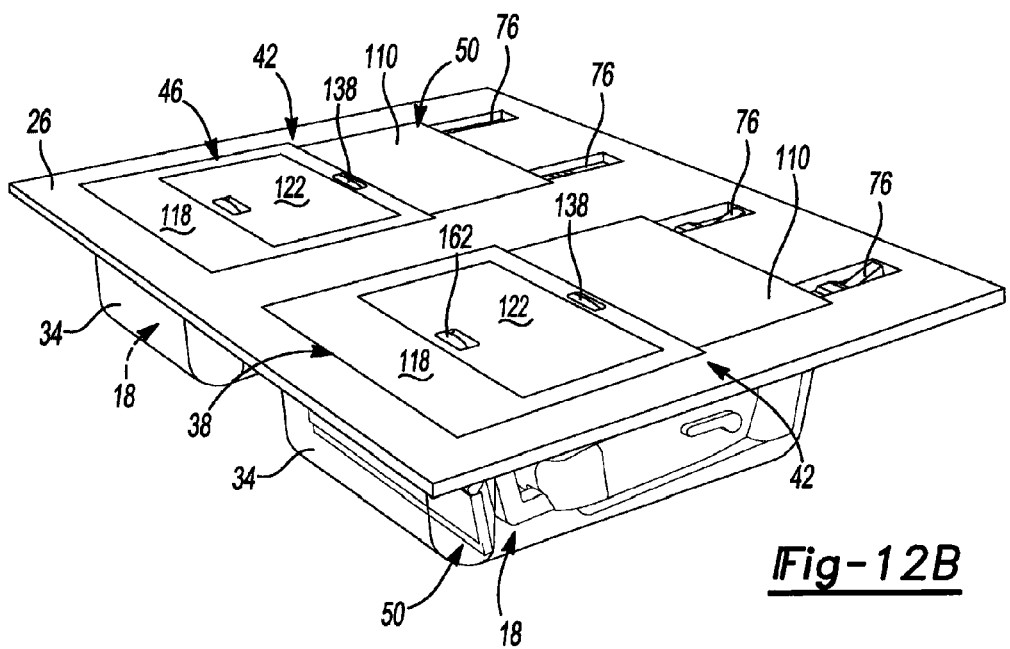
Figure 12C:
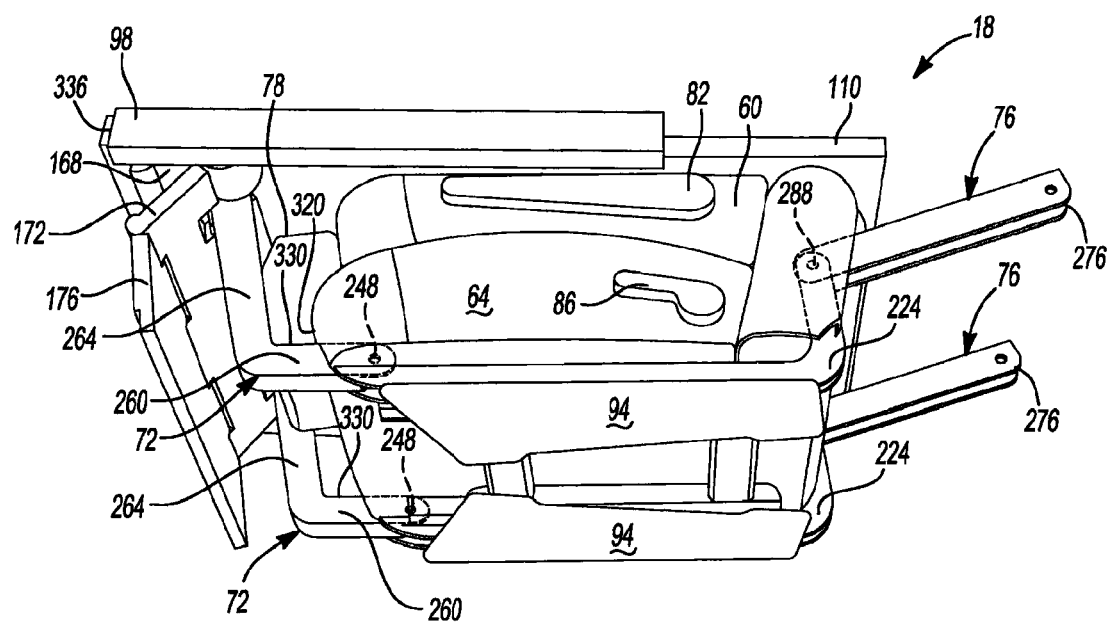

As will be discussed in greater detail below, each seat assembly 18 can be individually stowed in one of the stowage recesses 34 to provide a flat load floor configuration 38, as shown for example in FIG. 3 with respect to the passenger side seat assembly 18 and FIG. 12B with respect to both the driver and passenger side seat assemblies 18. In addition to being stowable, the seat assembly 18 can also include fore-aft adjustment, as well as automatic opening and closing and/or movement of a stowage recess cover assembly 42 in connection with deploying and stowing the seat assembly 18, respectively.

With additional reference to FIGS. 6-12B, the seat assembly 18 and stowage recess access cover assembly 42 will now be discussed in greater detail. As discussed above, several features of seat assembly 18 will be discussed below in connection with the driver side outboard seat assembly 18 shown in the various figures. In this regard, when duplicate components are discussed, such as a pair of front legs, it should be appreciated that an inboard side 54 of the seat assembly 18 opposite an outboard side 58 can have the same structure and operation with respect to such components and/or features and thus the inboard side 54 will generally not be separately discussed in detail herein.

In one exemplary configuration, seat assembly 18 can include a seat back 60, a seat bottom 64, a seat frame assembly 68, and a pair of front legs 72 and rear legs 76 each operatively associated with the seat frame assembly 68. Seat assembly 18 can further include a head rest 78, optional arm rests 82, a release lever 86 configured to facilitate folding or collapsing seat back 60 relative to seat bottom 64, and optional side panels 94 pivotably coupled to the seat frame assembly 68.

The seat back 60 can include a first or lower end 102 and a second or upper end 106. A floor panel 110 can be affixed to a rearward side of seat back 60 proximate the lower end 102, as shown for example in FIGS. 4 and 5. As will be discussed in more detail below, the floor panel 110 can form part of the flat load floor configuration 38 in place of second panel assembly 50 of stowage recess cover assembly 42 when seat assembly 18 is in the stowed configuration.

Figure 2:
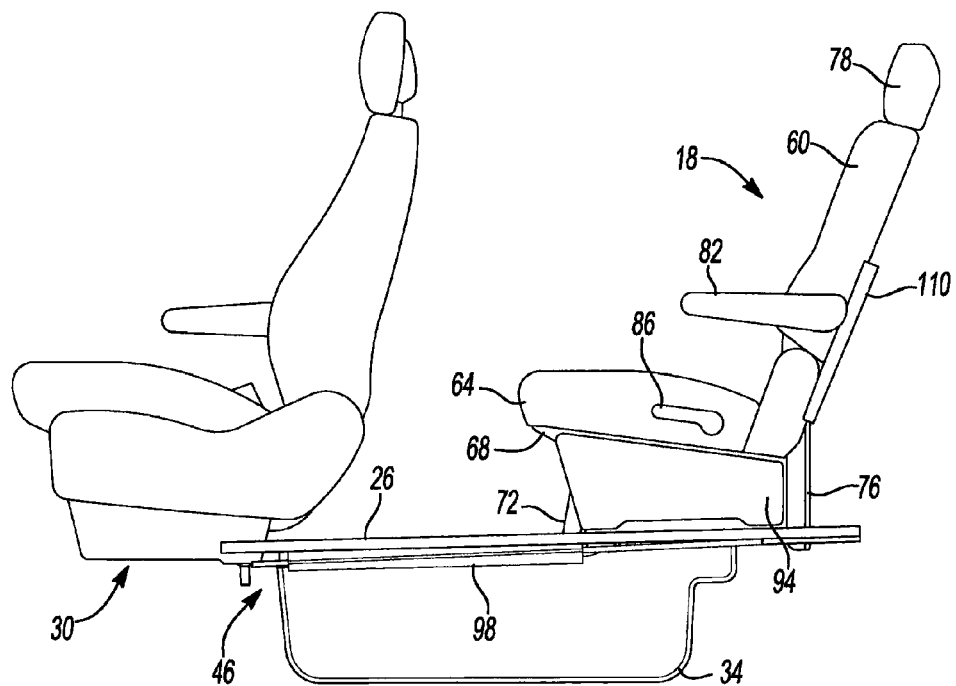
FIG. 2 is a side view depicting a first row seat along with the stowable seating arrangement of FIG. 1 according to the principles of the present disclosure.

A pair of floor tracks 98 can be coupled to the vehicle floor 26 proximate lateral sides of the stowage recess 34 and can be configured to facilitate deploying and stowing the seat assembly 18 in connection with coordinated movement of stowage recess cover assembly 42, as shown for example in FIGS. 2 and 7B and will be discussed in greater detail below. It should be appreciated that in several views of the drawings, such as FIG. 7B, the stowage recess 34, vehicle floor 26 and surrounding structure of the vehicle 14 are not shown in the bottom perspective views for clarity purposes.

Figure 7:
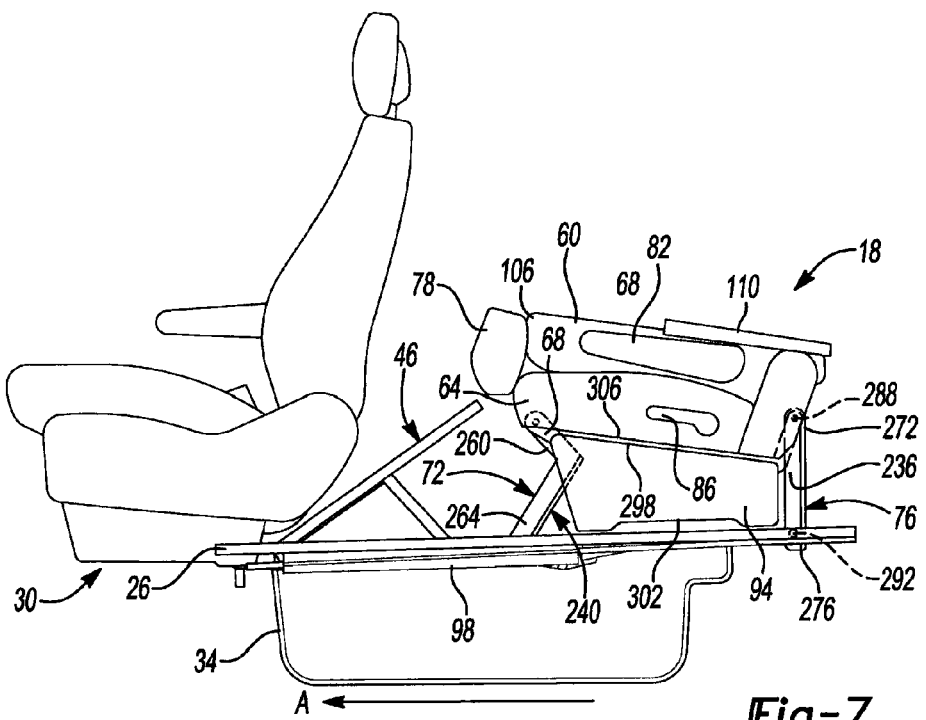
FIG. 7 is a side view of the stowable seating arrangement depicting the front legs released from a latched deployed position and the stowable seat assembly being moved/articulated toward a stowed position according to the principles of the present disclosure.
Figure 7A:
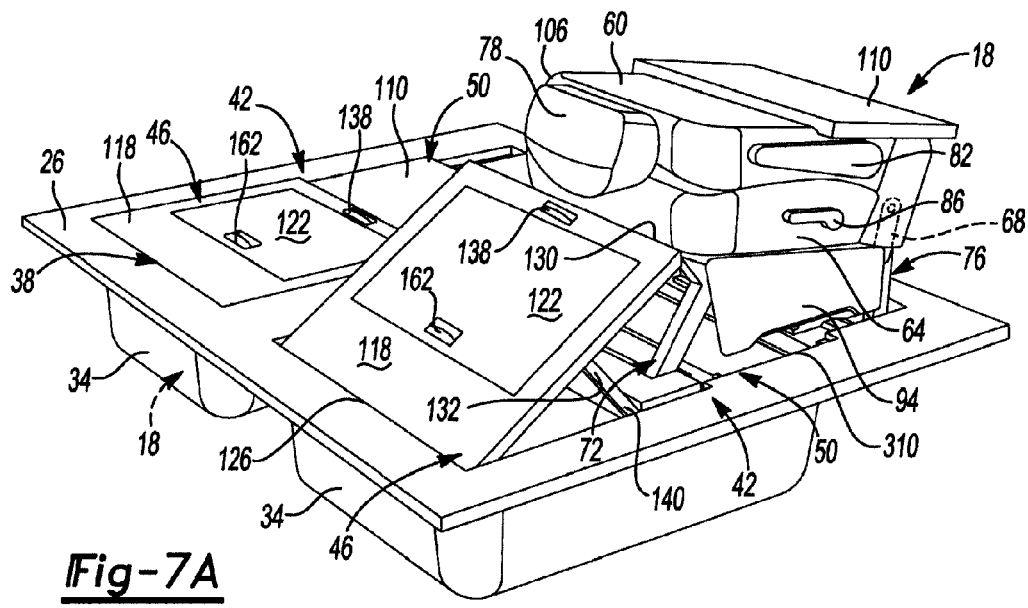
FIG. 7A is a perspective view of the stowable seating arrangement depicting the stowable seat assembly being moved/articulated to the stowed position according to the principles of the present disclosure.
Figure 7B:
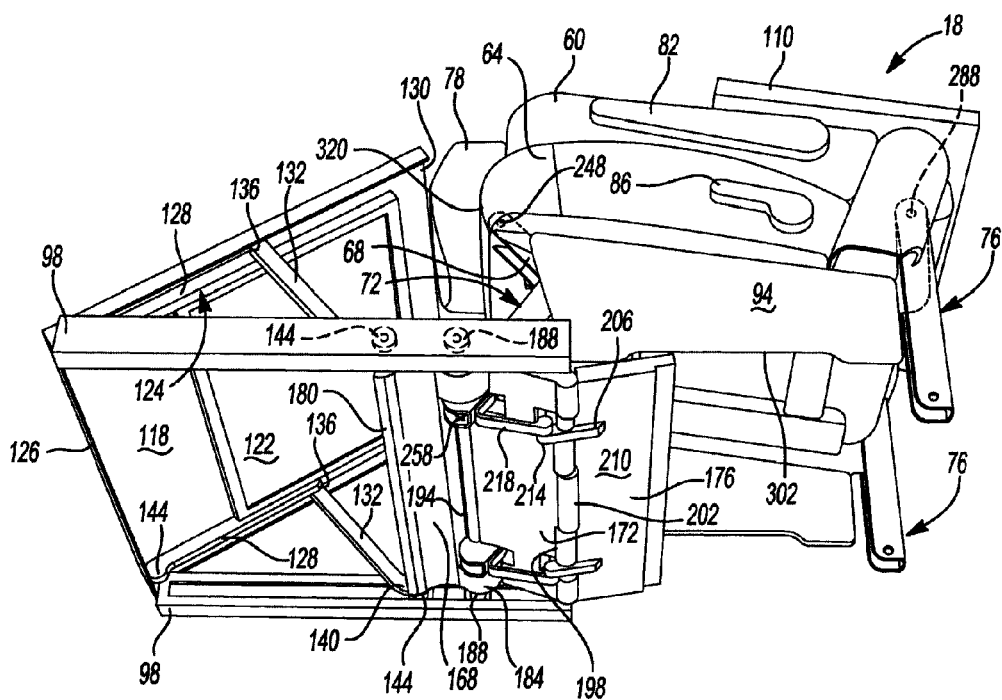
FIG. 7B is a partial bottom perspective view of FIG. 7A depicting the stowable seat assembly being moved/articulated to the stowed position according to the principles of the present disclosure.

With particular reference to FIGS. 7A and 7B, the stowage recess cover assembly 42 will now be discussed in greater detail. The first panel assembly 46 of the stowage recess cover assembly 42 can include an outer panel 118, an inner access panel 122 pivotably coupled to outer panel 118, and a frame assembly 124 coupled to an underside of outer panel 118. Outer panel 118 can include a forward end 126 pivotably coupled to the vehicle, such as to floor 26 or stowage recess 34, and a rearward end 130 opposite forward end 126. A handle and/or release mechanism 138 can be positioned proximate the rearward end 130 to facilitate releasing and pivotably raising the first panel assembly 46, as shown for example in FIG. 7A. Releasing and raising the first panel assembly 46 can automatically initiate a stowage process for stowing seat assembly 18, as will be discussed in greater detail below.

The frame assembly 124 can include a pair of first members 128 attached to the underside of outer panel 118 and a pair of second link members 132 pivotably coupled at a first end 136 to the pair of first members 128 and pivotably coupled at a second opposite end 140 to the second panel assembly 50, as shown for example in FIG. 7B. A first pair of rollers 144 can be coupled to the second end 140 of second link members 132. The rollers 144 can ride in the pair of floor tracks 98, as also shown in FIG. 7B. In one exemplary configuration, the first panel assembly 46 can be pivotably coupled to the vehicle via a forward end 148 of first members 128.

Figure 4:
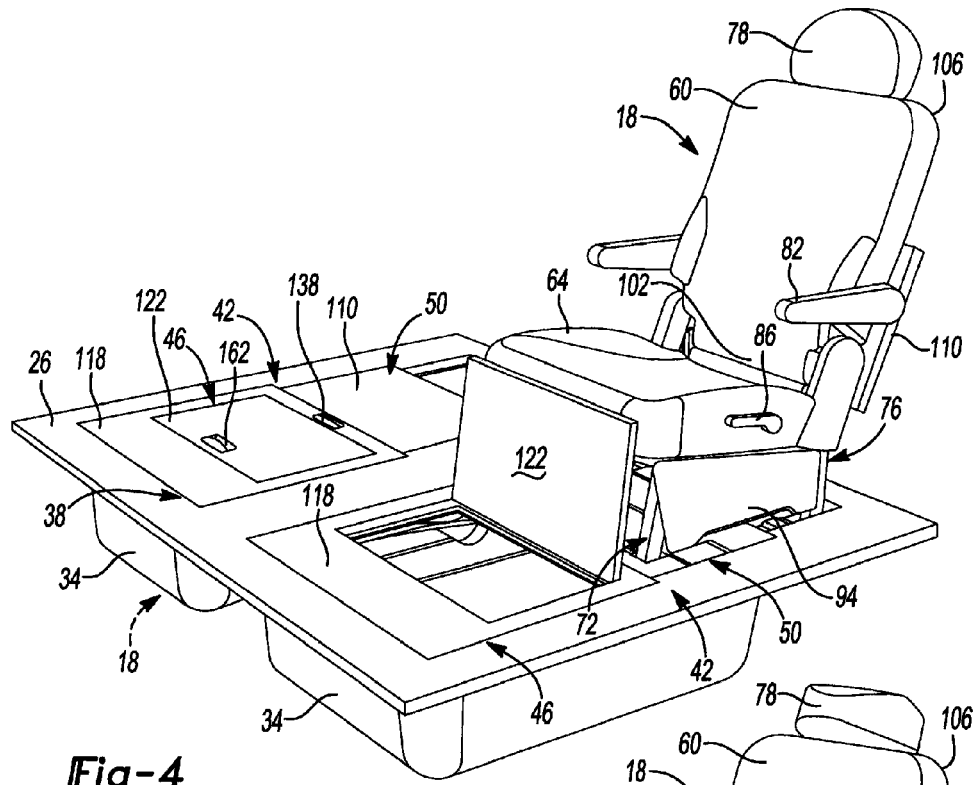
FIG. 4 is a perspective view of the stowable seating arrangement of FIG. 3 illustrating an inner access panel of a stowage recess cover assembly in an open position according to the principles of the present disclosure.

Inner access panel 122 can include a forward end 154 and a rearward end 158 opposite forward end 154. The rearward end 158 of inner panel 122 can be pivotably coupled to outer panel 118, and the forward end 154 can include a handle or undercut 162, as shown for example in FIG. 7A. Inner access panel 122 can be independently movable relative to outer panel 118 to, for example, provide access to stowage recess 34 without initiating the seat stowage process, as generally shown in FIG. 4. In one exemplary configuration, the inner access panel 122 can be surrounded by the outer access panel 118, as also shown in FIG. 7A.

The second panel assembly 50 can include a first panel member 168, a second panel member 172 and a third panel member 176, as shown for example in FIG. 7B. The first panel member 168 can include a forward end 180 pivotably coupled to the pair of second link members 132, and a rearward end 184 having a second pair of rollers 188 coupled thereto and riding in the pair of floor tracks 98. In one exemplary configuration, first panel member 168 of second panel assembly 50 can ride in floor tracks 98 in a fore-aft direction and can be prevented from pivoting relative to floor tracks 98 due to the first and second pairs of rollers 144, 188 riding in and being captured by the floor tracks 98.

The second panel member 172 can include a forward end 194 pivotably coupled to the first panel member 168 and/or the pair of front legs 72. A rearward end 198 of the second panel member 172 can be pivotably coupled to a forward end 202 of the third panel member 176. In one exemplary configuration, third panel member 176 can include a pair of structural members or ribs 206 extending from an underside 210 of the third panel member 176 in a forward direction such that a portion 214 extends beyond the forward end 202 of the third panel member 176 and the rearward end 198 of the second panel member. A pair of brackets 218 can couple the portion 214 to the front legs 72 so as to maintain a fixed positional relationship of the third panel member 176 relative to the front legs 72, as also shown for example in FIG. 7B.

With general reference to FIGS. 2-12C and particular reference to FIGS. 7 and 10B, the seat frame assembly 68, front legs 72, rear legs 76 and optional side panels 94 will now be discussed in greater detail. The seat frame assembly 68 can include a pair of frame members 224 attached to an underside of seat bottom 64 and can generally extend from a first or forward end 228 to a second or rearward end 232 of seat bottom 64. In the exemplary configuration illustrated, the frame members 224 can include a U-shaped configuration with an open end 234 facing toward the vehicle floor 26. In this exemplary configuration, the frame members 224 can extend around the rearward end 232 of seat bottom 64 in a direction away from floor 26 to a rearward end 236 when seat assembly 18 is in the deployed position.

Figure 10A:
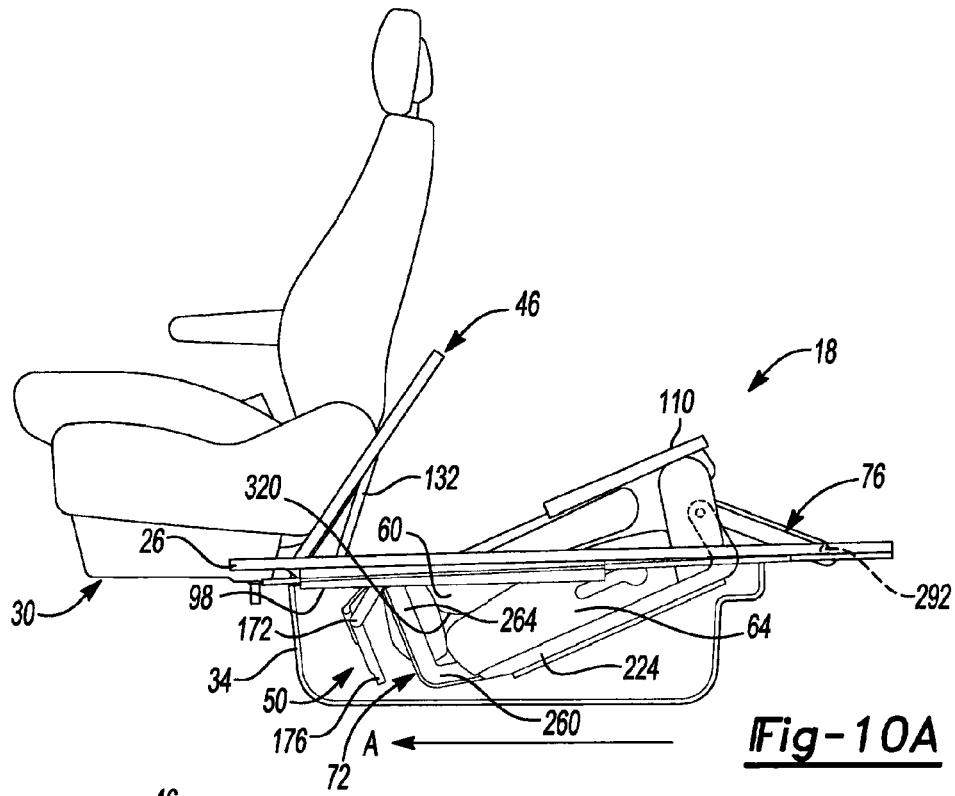
Figure 10B:
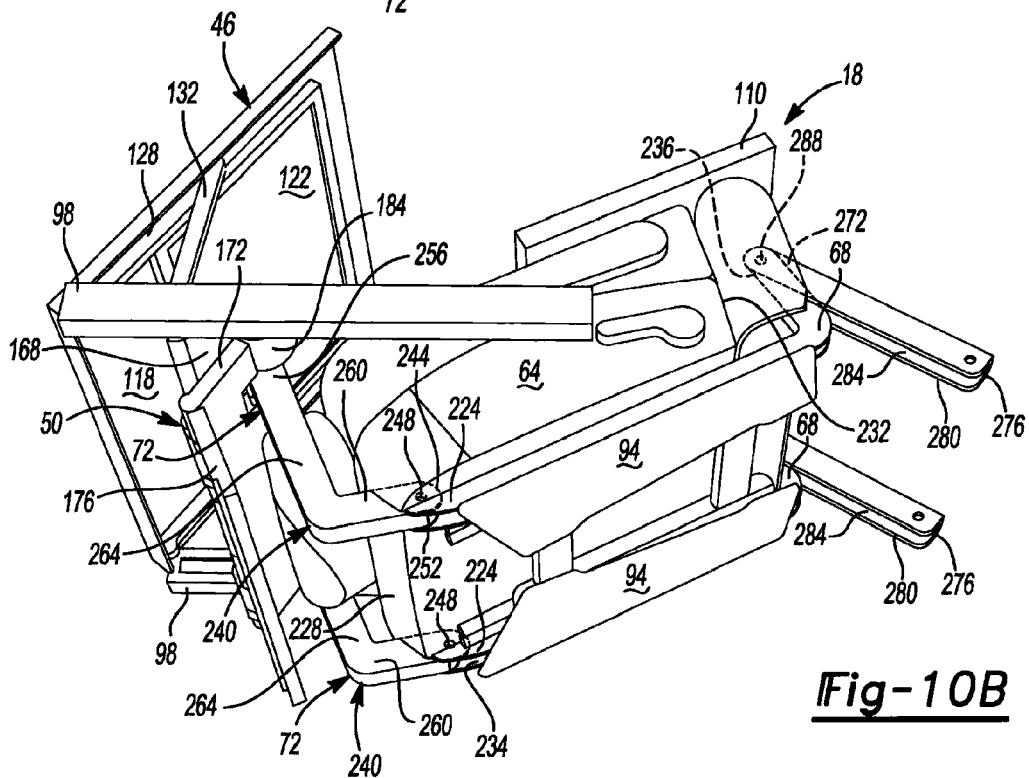

The pair of front legs 72 can include a substantially L-shaped configuration 240 with a first end 244 pivotably coupled 248 to a forward end 252 of frame members 224, as shown for example in FIG. 10B. A second end 256 of front legs 72 can be pivotably coupled 258 to the rearward end 184 of first panel member 168. The pair of front legs 72 can be sized and shaped such that when seat assembly 18 is in the deployed position, a first member or portion 260 of the L-shaped configuration 240 can nest within the U-shaped frame members 224 via open end 234, as generally shown in FIG. 7 with reference to FIG. 6. A second member or portion 264 of the L-shaped configuration 240 extending from the pivotable coupling 248 can extend substantially vertically from the floor 26 when seat assembly 18 is in the deployed position.

The pair of rear legs 76 can include a first or upper end 272 a second or lower end 276, and can be formed with a U-shaped channel configuration 280 having an open end 284, as shown for example in FIG. 10B. The upper end 272 can be pivotably coupled 288 to the rearward end 236 of frame members 224 and the lower end 276 can be pivotably coupled 292 to the vehicle 14. In the exemplary configuration illustrated, at least a portion of the rearward end 236 of frame members 224 can nest within the U-shaped channel configuration 280 of rear legs 76 via open end 284, as also shown in FIG. 10B. It should be appreciated that while frame members 224 are illustrated as having a unitary L-shaped configuration with the rearward end 236 wrapping around seat bottom 64 and being coupled to rear legs 76, the frame members 224 could also be provided in multiple sections and/or the rear legs 76 could be coupled to seat bottom 64 independently of frame members 224.

The optional side panels 94 can include an upper end 298 and an opposite lower end 302. The upper end can be pivotably coupled 306 to the frame members 224 such that the panels 94 extend from the frame members toward the vehicle floor 26 when seat assembly 18 is in the deployed position, as generally shown in FIGS. 2 and 3. The side panels can be linked, such as by a cable or other suitable means (not shown) to the front legs 72 or second panel assembly 50 such that upon the front legs 72 and second panel assembly 50 moving forward during the stowage process, the side panels 94 can be pivoted inward about pivotable coupling 306, as generally shown in FIGS. 8A-10B. The side panels 94 can be pivoted inward such that lower end 302 approaches the underside of seat bottom 64.

Figure 5:
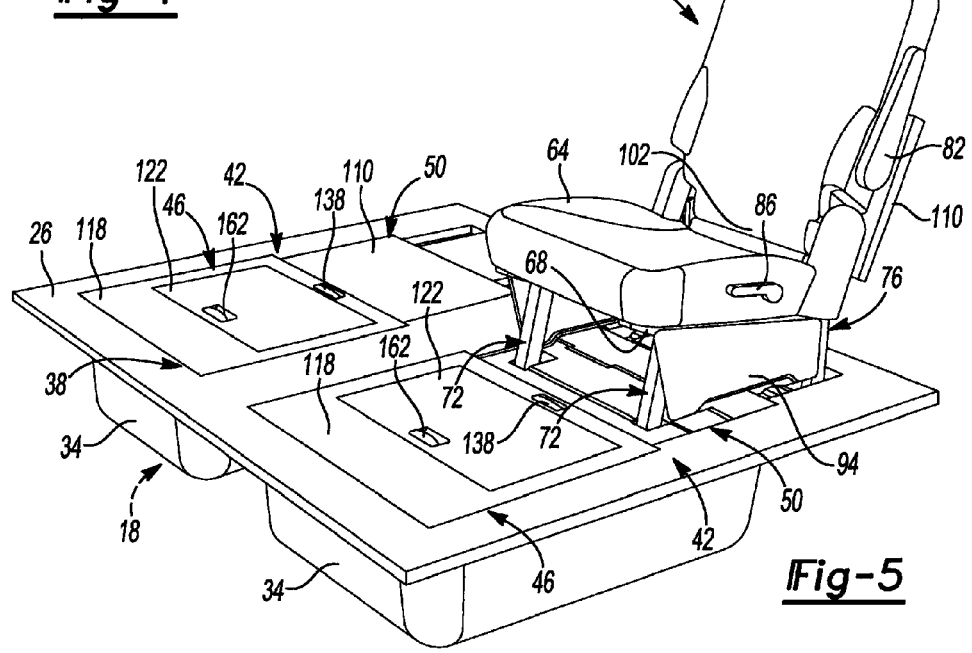
FIG. 5 is a perspective view of the stowable seating arrangement of FIG. 3 with arm rests and a head rest of the stowable seat in a stowable position according to the principles of the present disclosure.
Figure 6:
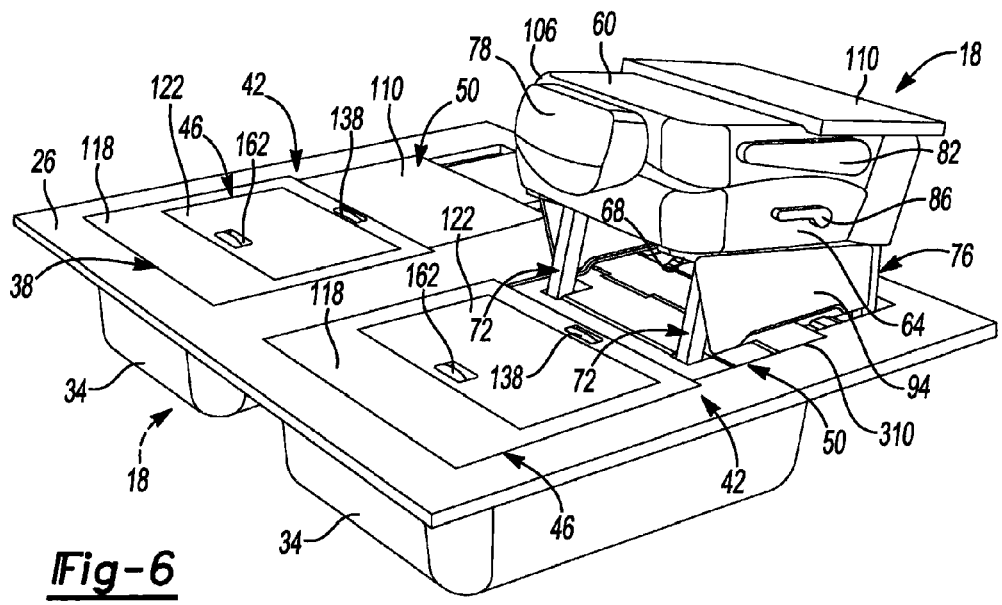
FIG. 6 is a perspective view of the stowable seating arrangement of FIG. 5 with the seat back in a collapsed position according to the principles of the present disclosure.

With reference to FIGS. 5-12C, operation and stowage of seat assembly 18 in connection with stowage recess 34 and cover assembly 42 will now be discussed in greater detail. To stow the seat assembly 18, seat back 60 can be pivoted or rotated to a collapsed or stowed position substantially parallel to seat bottom 64 by actuation of release lever 86, as shown in FIG. 6. Actuation of release lever 86 can also fold or collapse head rest 78 and optional arm rests 82 to a stowed position, as shown in FIG. 5.

The handle and release mechanism 138 can then be actuated to release first panel assembly 46 from the flat load floor position shown in FIG. 6. In this regard, the release mechanism 138 can be releasably coupled to the second panel assembly and/or the vehicle floor by any suitable means. Alternatively, the first panel assembly 46 could be spring biased to the load floor configuration such that a release mechanism may not be required and handle and release mechanism 138 could include only a handle or undercut to facilitate pivotably raising first panel assembly 46. In another alternative configuration, the first panel assembly 46 can be both spring biased to the flat load floor position of FIG. 6 as well as operatively coupled to the handle and release mechanism 138.

Upon actuation of handle and release mechanism 138 and pivotably raising first panel assembly 46, the second link members 132 can draw the second panel assembly 50 downward toward stowage recess 34 and in a forward direction indicated by Arrow A in FIGS. 7 and 7A. Thus, the second panel assembly 50 can be drawn downward and forward from a deployed position where second panel assembly 50 occupied a space 310 forming part of a covering over stowage recess 34 when seat assembly 18 is in the deployed position.

As the front legs 72 are pivotably coupled to the first panel member 168 of the second panel assembly 50, this action can begin to draw and articulate a forward end 320 of seat assembly 18 in the forward direction A and downward toward/into stowage recess 34. In particular, this action can cause the front legs 72 to pivot about both the pivotable coupling 248 to frame members 224 and the pivotable coupling to first panel member 168. In this regard, the L-shaped configuration 240 of the front legs 72 can aide in moving the second panel assembly 50 forward in the direction of Arrow A and in front of seat assembly 18, as will be discussed in greater detail below.

Continued raising of first panel assembly 46 can pivot the front legs 72 such that the first portion 260 pivots from a deployed nesting position in frame members 224, in which first portion 260 can be substantially parallel to frame members 224 and positioned behind or rearward of forward end 228 of seat bottom 64, as shown for example in FIGS. 7A-8B. During this action, the rear legs 76 can also pivot about couplings 288, 292 as seat assembly 18 articulates toward the stowed position. As the rear legs 76 pivot with movement of seat assembly 18, the rearward end 236 of frame members 224 can extend out of the deployed nested position in the upper end 272 of rear legs 76 via open end 284.

Figure 8A:
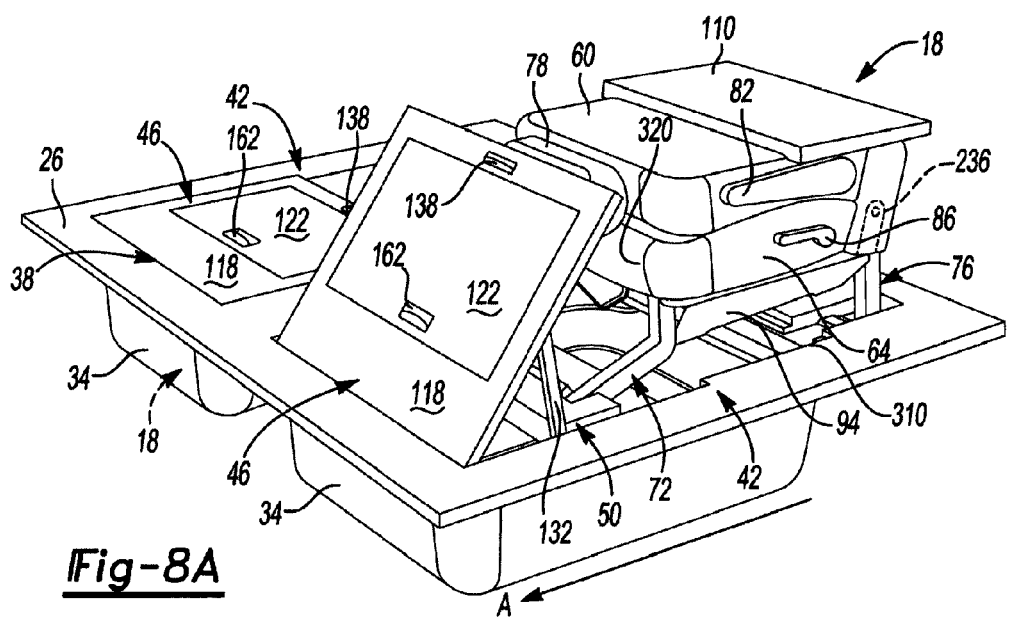
FIG. 8A is a perspective view depicting the stowable seat assembly being moved/articulated to the stowed position with the front legs advancing along a track arrangement and moving a second panel assembly of the stowage recess cover assembly therewith according to the principles of the present disclosure.
Figure 8B:
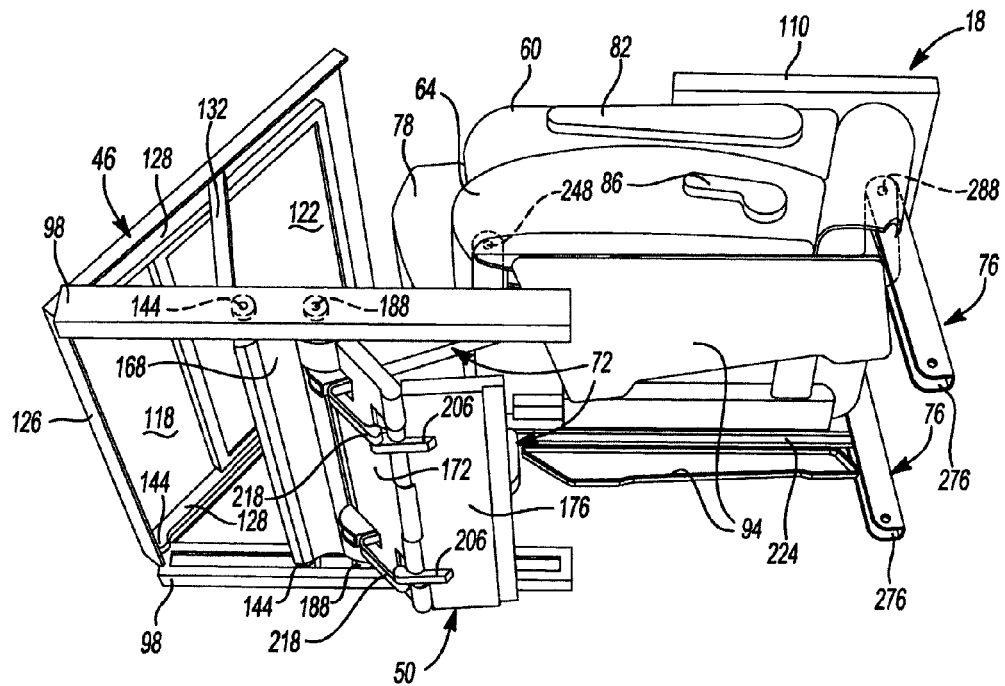
FIG. 8B is a partial bottom perspective view of FIG. 8A depicting the stowable seat assembly being moved/articulated to the stowed position with the front legs advancing along the track arrangement and moving a portion of the vehicle floor therewith according to the principles of the present disclosure.

Once the first panel assembly 46 is pivotably raised to the position shown in FIGS. 8A-8B, the forward end of seat assembly 18 can be further articulated downward and forward into stowage recess 34, as shown for example in the transition between FIGS. 8A, 8B and FIGS. 9A, 9B. This action can further pivot front legs 72 such that the first and second portions 260, 264 are now positioned substantially in front of seat assembly 18, as shown for example in FIG. 9B. This movement of front legs 72 can automatically articulate second panel assembly 50 to a position forward of seat assembly 18, as also shown for example in FIG. 9B, to facilitate compact stowage of seat assembly 18 in stowage recess 34.

Figure 9A:
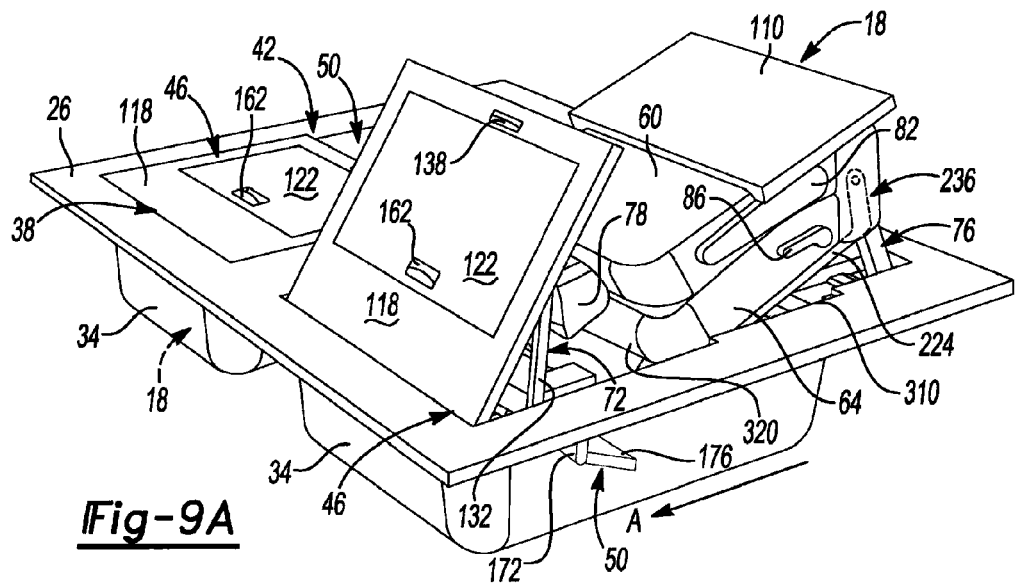
FIGS. 9A-11B are views depicting the stowable seat assembly being moved/articulated to the stowed position with the front legs advancing along the track arrangement and moving the second panel assembly therewith according to the principles of the present disclosure.
Figure 9B:
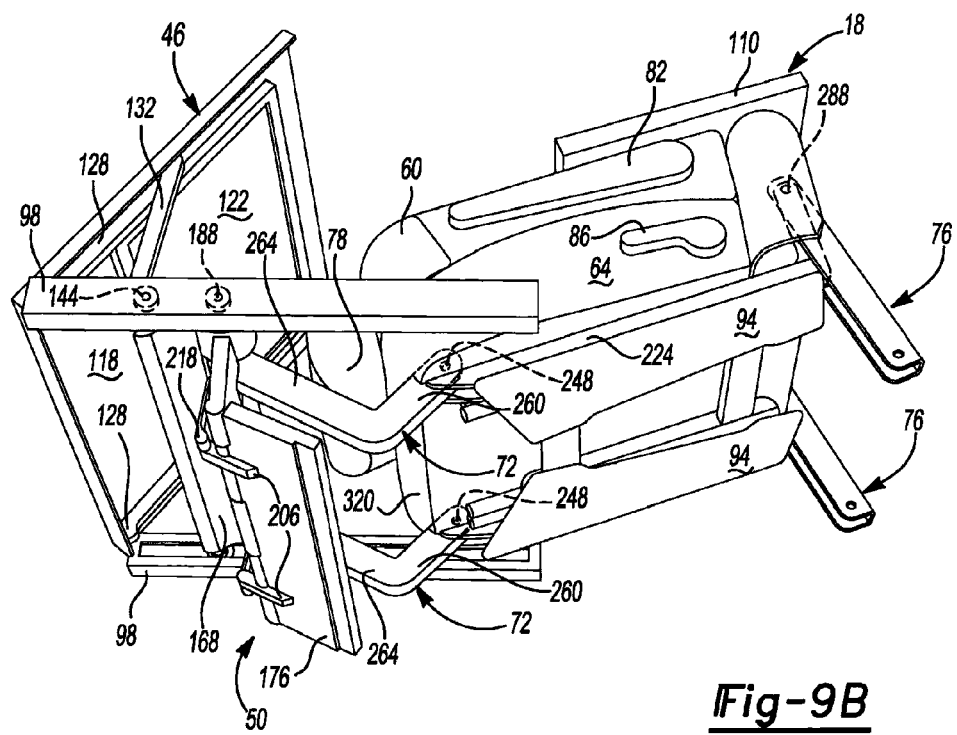

The second panel assembly 50 can be automatically articulated to the position shown in FIG. 9B via the L-shaped configuration 240 of front legs 72 in cooperation with the ribs 206 and brackets 218 associated with second panel assembly 50. Further, using separate second and third panel members 172, 176 pivotably coupled to each other along with brackets 218 can provide for being able to angle the second and third panel members 172, 176 relative to each other during the stowage process (and in the stowed position shown in FIGS. 12A-C). This can result in requiring less height or depth of the stowage recess 34 to accommodate stowing seat assembly 18.

As can be seen in FIGS. 10A-11B, seat assembly 18 can be articulated forward and downward into stowage recess 34 such that the seat bottom 64 does not need to be flipped over or inverted. At this point in the stowage process, the front legs 72 can be rotated approximately 180 degrees about pivotable coupling 248 such that an upper surface 330 of the first portion 260 of front legs 72 now faces the stowage recess 34 instead of seat bottom 64. With the front legs 72 in this position, the second panel assembly 50 can be further articulated forward in front of seat assembly 18, as shown in FIG. 10B.

Figure 11A:
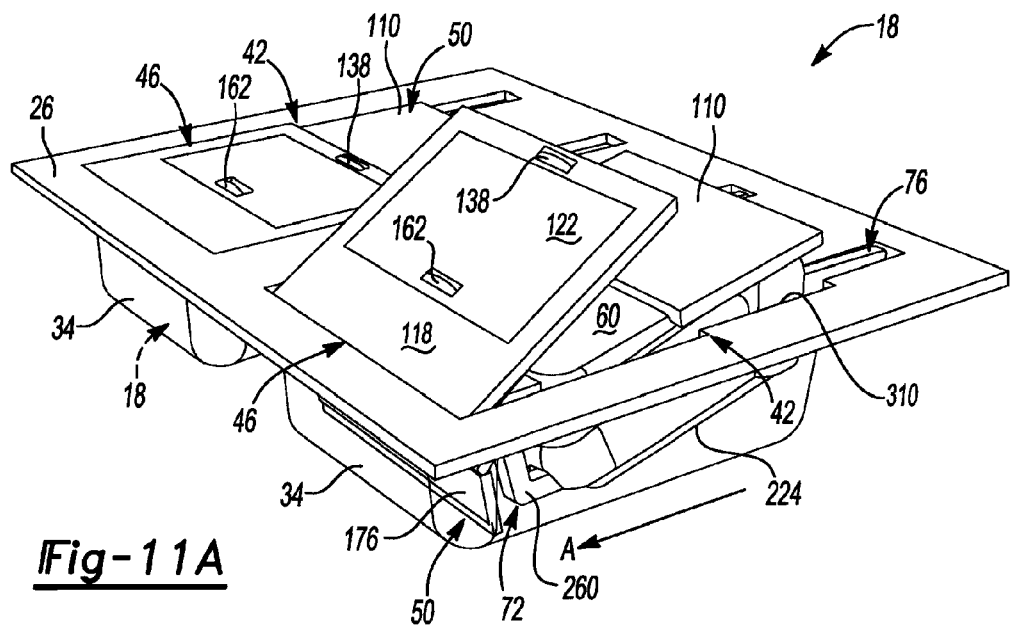
Figure 11B:
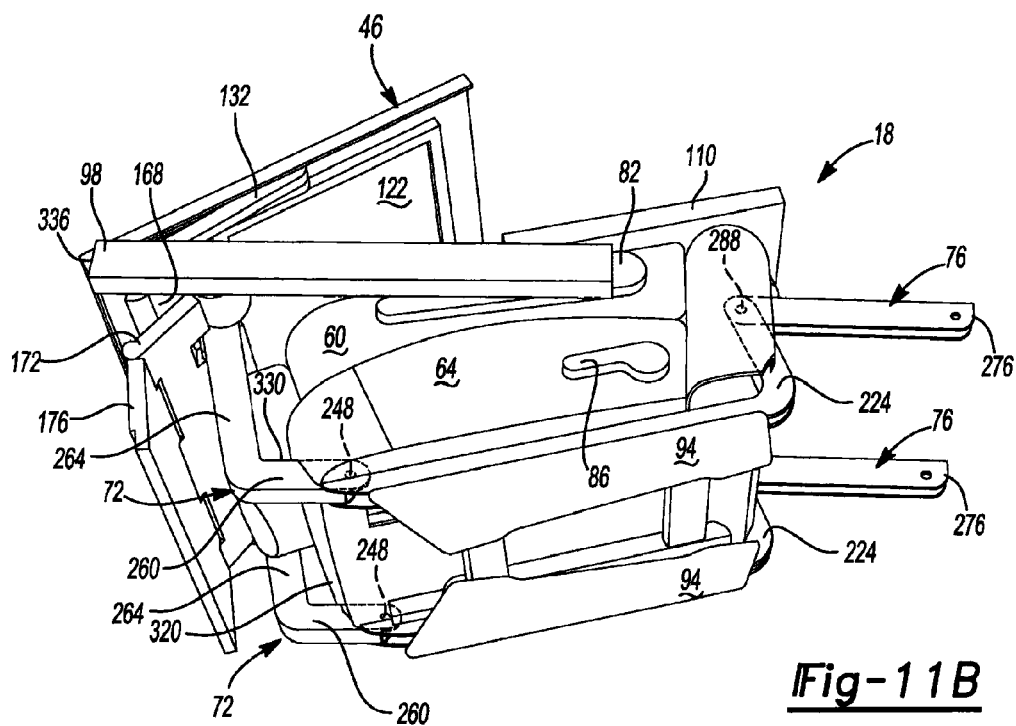

Continued articulation of seat assembly 18 into stowage recess 34 can translate first panel member 168 toward a forward end 336 of floor tracks 98, as shown in FIGS. 11A-11B. In this position, the second and third panel members 172, 176 can each extend forward of a rearward end 184 of first panel member 168. Further movement of seat assembly 18 into stowage recess 34 can position seat assembly 18 in the stowed position in stowage recess 34. When seat assembly 18 is articulated to the stowed position shown in FIGS. 12A-12C, floor panel 110 coupled to seat back 60 can automatically occupy the space 310 that was occupied by second panel assembly 50 when seat assembly 18 was in the deployed position. Thus, the second panel assembly 50 can be positioned under the seat bottom 64 parallel to or substantially parallel to the vehicle floor 26 and first panel assembly 46 when seat assembly 18 is in the deployed position, and can be automatically articulated to a position forward of seat assembly 18 and under first panel assembly 46 when seat assembly 18 is in the stowed position.

In this regard, floor panel 110 can be sized and shaped as to be the same or substantially the same size and shape as second panel assembly 50 and space 310. In one exemplary configuration, the outer perimeters of the second panel assembly 50, space 310 and floor panel 110 can be the same or substantially the same. The floor panel 110 can automatically transition from the deployed position to the stowed position where floor panel 110 is flush or substantially flush with vehicle floor 26 to form the flat load floor configuration 38 as seat assembly 18 is articulated from the deployed position (e.g., FIG. 3) to the stowed position (e.g., FIG. 12B). It should be appreciated that seat assembly 18 can be redeployed from the stowed position in stowage recess 34 to the deployed position by again raising first panel assembly 46 and then generally reversing the process discussed above for stowing seat assembly 18.

What is claimed is:

1. A stowable seat arrangement for a vehicle having a floor, comprising:
    a seat having a seat back pivotably coupled to a seat bottom;
    a pair of front legs and a pair of rear legs;
    a floor panel fixed to the seat back;
    a stowage recess cover assembly including a first panel assembly pivotably coupled to a second panel assembly, the first panel assembly pivotably coupled at a forward end to the vehicle, the second panel assembly pivotably coupled to the pair of front legs; and
    a pair of frame members coupled to the seat bottom, the pair of front legs pivotably coupled to a forward end of the frame members and the pair of rear legs pivotably coupled to a rearward end of the frame members;
    the seat configured to selectively articulate from a deployed position to a stowed position where the seat is adapted to be received in a stowage recess of the vehicle, wherein pivotably raising the cover assembly about the forward end is configured to automatically begin articulation of the seat from the deployed position to the stowed position, the floor panel being positioned in spaced relation to the vehicle floor when the seat is in the deployed position and configured to automatically move with the seat to a position in engagement with the vehicle floor to provide a flat vehicle load floor configuration when the seat is in the stowed position.

2. The seat arrangement of claim 1, wherein the first panel assembly forms the forward end of the cover assembly, and wherein pivotably raising the cover assembly about the forward end includes pivotably raising the first panel assembly about the forward end relative to the vehicle floor and the second panel assembly.

3. The seat arrangement of claim 2, wherein the first panel assembly includes an outer panel and an inner panel surrounded by the outer panel, the outer panel pivotably coupled to the vehicle, the inner panel pivotably coupled to the outer panel and independently movable relative to the outer panel.

4. The seat arrangement of claim 1, wherein the pair of front legs each include an L-shaped configuration having first and second members, the first members pivotably coupled to the frame members and the second members pivotably coupled to the second panel assembly.

5. The seat arrangement of claim 4, wherein the first members each nest at least partially within the frame members and extend rearward from the pivotable connection to the frame members when the seat is in the deployed position, and wherein the first members each extend in an opposite forward direction from the pivotable connection to the frame members such that the second members are forward of the seat when the seat is in the stowed position.

6. The seat arrangement of claim 1, wherein the second panel assembly is positioned under the seat bottom and rearward of the first panel assembly when the seat is in the deployed position, and wherein the second panel assembly is positioned forward of the seat and under first panel assembly when the seat is in the stowed position.

7. The seat arrangement of claim 6, wherein the second panel assembly includes a first outer perimeter sized and shaped to be received in a space in the vehicle floor having a second outer perimeter complimentary to the first perimeter when the seat is in the deployed position, and wherein the floor panel includes a third outer perimeter sized and shaped to be substantially the same as the first outer perimeter so as to be received in the space to form the flat load floor configuration when the seat is in the stowed position.

8. The seat arrangement of claim 1, further comprising:
a pair of floor tracks coupled to the vehicle relative to the floor; and
a pair of rollers coupled to the second panel assembly, the pair of rollers configured to ride in the pair of floor tracks, the second panel assembly configured to translate forward in the vehicle via the rollers upon pivotably raising the first panel assembly to facilitate stowing the seat in the stowed position.

9. The seat arrangement of claim 8, wherein the second panel assembly includes a first panel member, a second panel member, and a third panel member, the first panel member coupled to the pair of rollers and the pair of front legs, and wherein at least the second and third panel members are pivotably coupled to each other.

10. The seat arrangement of claim 9, further comprising a pair of link members pivotably coupling the first panel assembly to the first panel member of the second panel assembly.

11. The seat arrangement of claim 9, wherein the first, second and third members are positioned substantially parallel to the first panel assembly and the floor tracks when the seat is in the deployed position, and wherein in the stowed position, the second and third panel members are angled relative to the first panel member and positioned below the floor tracks.

12. The seat arrangement of claim 9, wherein the first panel member is positioned proximate a rearward end of the floor tracks when the seat is in the deployed position and translates via the rollers along the floor tracks to an opposite forward end during articulation of the seat to the stowed position.

13. A stowable seat arrangement for a vehicle having a floor, comprising:
a seat having a seat back pivotably coupled to a seat bottom;
a pair of frame members coupled to the seat bottom;
a pair of front legs each having first and second members formed in an L-shaped configuration, the first members coupled at a first end of the front legs to a forward end of the frame members;
a pair of rear legs each pivotably coupled at a first end to an opposite rearward end of the frame members;
a floor panel fixed to the seat back;
a stowage recess cover assembly having first and second panel assemblies pivotably coupled to each other by a pair of linking members, the first panel assembly pivotably coupled at a forward end to the vehicle, the second panel assembly pivotably coupled to the second members at a second opposite end of the front legs, the second panel assembly forming part of the vehicle floor and covering a portion of a stowage recess in a first position when the seat is in a deployed position; and
the seat configured to selectively articulate from the deployed position to a stowed position where the seat is configured to be received in the stowage recess of the vehicle, wherein pivotably raising the first panel assembly about the forward end is configured to automatically begin articulation of the seat from the deployed position to the stowed position, the second panel assembly configured to automatically move from the first position to a second position in front of the seat when the seat is in the stowed position, the floor panel being positioned in spaced relation to the vehicle floor when the seat is in the deployed position and configured to automatically move with the seat to a substantially horizontal position relative to and in engagement with the vehicle floor to form the part of the vehicle floor formed by the second panel assembly in the first position and provide a flat vehicle load floor configuration when the seat is in the stowed position.

14. The seat arrangement of claim 13, further comprising:
a pair of floor tracks coupled to the vehicle proximate to the floor and the stowage recess; and
a pair of rollers coupled to the second panel assembly, the pair of rollers configured to ride in the pair of floor tracks, the second panel assembly configured to translate forward in the vehicle via the rollers upon pivotably raising the first panel assembly to facilitate stowing the seat in the stowed position.

15. The seat arrangement of claim 14, wherein the second panel assembly includes a first panel member, a second panel member, and a third panel member, the first panel member coupled to the pair of rollers and the second end of the pair of front legs, and wherein at least the second and third panel members are pivotably coupled to each other.

16. The seat arrangement of claim 15, wherein the first, second and third members are positioned under the seat bottom rearward of and substantially parallel to the first panel assembly when the seat is in the deployed position, and wherein in the stowed position, the second and third panel members are angled relative to the first panel member and positioned below the floor tracks under the first panel assembly and forward of the seat.

17. The seat arrangement of claim 15, wherein the first panel member is positioned proximate a rearward end of the floor tracks when the seat is in the deployed position and translates via the rollers along the floor tracks to an opposite forward end during articulation of the seat to the stowed position.

18. The seat arrangement of claim 13, wherein the first members of the pair of front legs each nest at least partially within the frame members and extend rearward from the pivotable connection to the frame members when the seat is in the deployed position, and wherein the first members each extend in an opposite forward direction from the pivotable connection to the frame members such that the second members are forward of the seat when the seat is in the stowed position.

* * * * *